(No Model.)
H. A. SCHRY.
POWER TRANSMITTER.
No. 598,014. Patented Jan. 25, 1898.
Fig. 1.
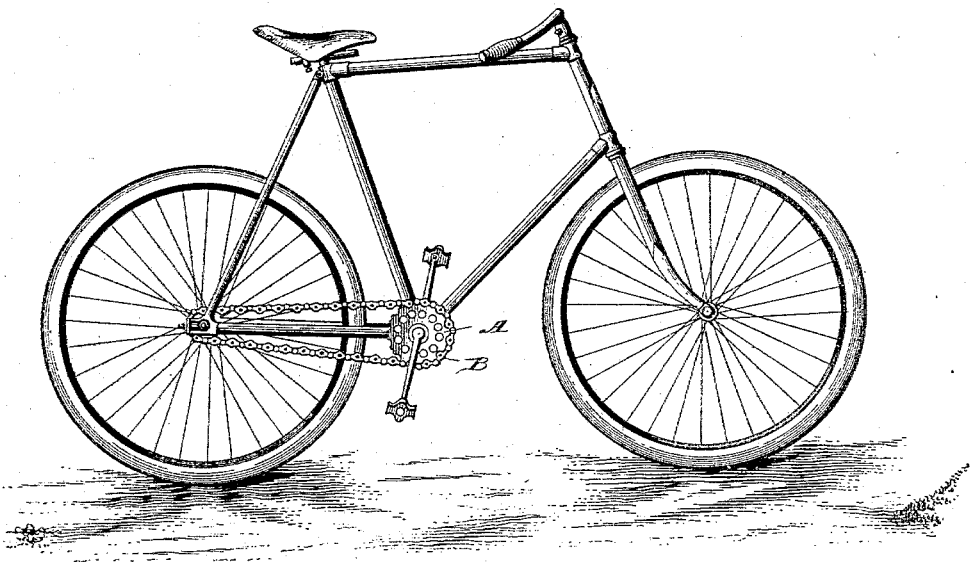
Fig. 2.
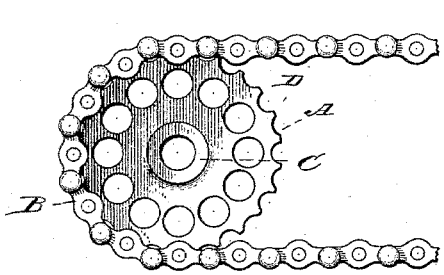
Fig. 3.
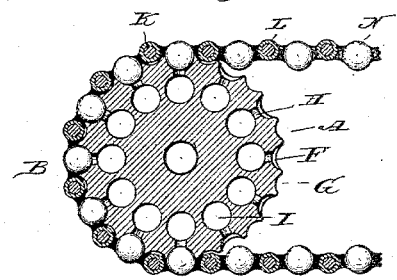
Fig. 4.
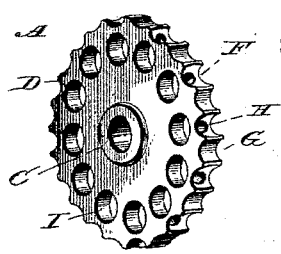
Fig. 5.
Fig. 6.
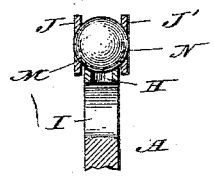
Fig. 7.
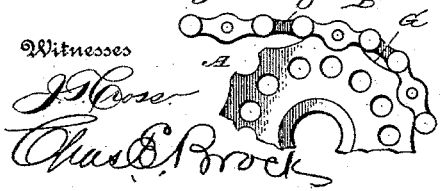
Fig. 8.
Fig. 9.
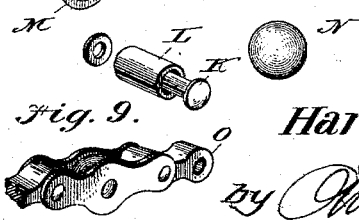
Witnesses
J. H. Rose
Chas. E. Brock
Inventor
Harry A. Schry,
by O'Mara & Co.
Attorneys
THE NORRIS PETERS CO., PHOTO-LITHO., WASHINGTON, D. C.

UNITED STATES PATENT OFFICE.

HARRY A. SCHRY, OF LORELEY, MARYLAND, ASSIGNOR OF THREE-FOURTHS TO GEORGE KRUEGER, OF JOHNSTOWN, PENNSYLVANIA.

POWER-TRANSMITTER.

SPECIFICATION forming part of Letters Patent No. 598,014, dated January 25, 1898.

Application filed May 13, 1897. Serial No. 636,425. (No model.)

*To all whom it may concern:*

Be it known that I, HARRY A. SCHRY, residing at Loreley, in Baltimore county, in the State of Maryland, have invented a new and useful Improvement in Power-Transmitters, of which the following is a specification.

My invention relates to drive-chains and sprockets of the class which are especially designed for use in bicycles or tricycles, but which may be used in any situation where drive-chains are applicable.

An object of my invention is to furnish a drive-chain and sprocket which will operate with the least possible friction, whereby there is less wear upon the mechanism, as well as the operator, and much less power is required.

A further object of my invention is to furnish a chain and sprocket in which the wear incident to use is not concentrated at sharp points, but is distributed over smooth somewhat extended closely-fitting curved surfaces, obviating all liability of irregular wear or rattling of the parts.

With these objects in view my invention consists in the improved construction, arrangement, and combination of parts hereinafter fully described and afterward specifically pointed out in the claims.

In the accompanying drawings, Figure 1 is a view of my improved chain and sprocket in side elevation as practically applied to a bicycle. Fig. 2 is an enlarged detail view, in side elevation, of one of the sprockets with a portion of a chain, the rest of the chain being broken away. Fig. 3 is a central vertical sectional view through the devices illustrated in Fig. 1, except that the balls are shown in side elevation. Fig. 4 is a perspective view of a sprocket-wheel with the chain removed. Fig. 5 is a detail perspective view showing a small section of chain. Fig. 6 is a detail sectional view, on a radial line, through a portion of the sprocket and one of the balls of the chain and its sockets. Fig. 7 is a detail perspective view showing the parts of which the chain is composed detached from each other. Fig. 8 is a fragmentary detail view in side elevation, showing a modified form of sprocket and chain; and Fig. 9 is a fragmentary detail view in perspective, showing a small section of the chain illustrated in Fig. 8.

Like letters of reference mark the same parts in all the figures of the drawings.

Referring to the drawings by letters, A is a sprocket-wheel, in this instance (see Fig. 1) shown as applied to a bicycle, although my invention, as before stated, is applicable to any and all sprocket-wheels and drive-chains.

B is the chain, which encircles and connects the sprocket-wheel with its fellow to transmit m tion in the usual manner from one to the other.

The sprocket-wheel A is provided with a hub C, which may be constructed in any well-known or approved form, and while in this instance I show the wheel as being of a single piece of metal this is not obligatory, it being only requisite that it be provided with a suitable hub, a rim D, the construction of which will be described in detail hereinafter, and a strong connection or support from the hub to the rim, which in the wheel I illustrate consists of the portion E of the solid piece of metal of which the wheel is made, although the rim and hub might be made of separate pieces, one connected by a separate plate or by spokes secured in any desired manner.

The rim D of the sprocket is provided with partially spherical sockets F in its periphery, separated by shallow curved notches G and provided with waste escape ducts or openings H, leading from the bottom of said sockets into openings I in the body or plate of the sprocket, said openings also serving to lighten the weight of the socket without detracting from its strength.

The chain B is composed of links, as is usual, each link consisting of two side plates J J', connected together by pivotal rivets or screws K and held at the proper distance apart by thimbles or short tubes L around the pivots and between the plates. Centrally located in each plate in its inner surface is formed a part M of a spherical socket, which part extends entirely through the plate, and when the two plates are properly secured in place these parts form portions of a single spherical socket, in which is placed a bearing-ball N, of steel or other suitable material, the sockets F in the periphery of the sprocket forming parts of the same spherical sockets and receiving those portions of the balls which are between the link-plates of the chain when the chain is on the wheel.

The separating thimbles or tubes L on the link-pivots and between the link-plates are fitted to rotate on said pivots and thus act as rollers, permitting the links to turn freely on their pivots.

In Figs. 8 and 9 I have shown a slightly-modified form of chain and sprocket-wheel, in which the chain is formed of links of the same construction, but has the ordinary connecting-plate O between the links, such construction necessitating the widening of the curved notches G in the periphery of the socket.

It will be observed from the foregoing description that the balls carried by the chains form teeth to enter the sockets in the wheels, and they, while firmly held against displacement or play in any direction, are perfectly free to turn in any and every direction.

By reason of the provision of the waste-escape ducts in the wheel and the extension of the sockets entirely through the link-plates of the chain any grease, dirt, or other foreign matter which may accumulate on the balls or in the socket will be, as it were, ground out through these openings. The provision of the part-sockets in the link-plates extending entirely through the plates is also advantageous in that it dispenses with considerable of the friction which would be otherwise unavoidable, it being possible with this construction to make the plates much thinner and lighter than it would be possible to make them were the sockets not extended through them. The location of these openings will be best seen by reference to Fig. 6, which shows that while the balls are firmly held against displacement by accident or otherwise but a small portion of their surface is in actual contact with other parts, thus dispensing with a large percentage of friction, wear, and noise in operation.

The construction of chain and sprocket described gives absolute freedom to every motion necessary to the proper transmission of power from one sprocket to another, but at the same time absolutely prevents lost motion from slipping of parts on each other and permits of the parts being made as light as possible with due regard to strength. The link-plates embrace the balls on both sides of their diameters, thus assuring them against dropping out of the socket, which is substantially skeleton, in bringing the least possible surface contact between socket and ball. At the same time the link-plates overlap the sides of the sprocket immediately at the sockets and prevent the balls jumping out of the wheel-sockets should there be at any time a little lost motion, due to slackness of the chain or otherwise.

Having thus fully described my invention, what I claim as new, and desire to secure by Letters Patent, is—

1. A drive-chain link composed of two parallel link-plates provided with suitable end pivotal connections and separators, each plate having an opposite portion of a spherical socket formed in its inner surface, and said plate extended beyond said socket to embrace or overlap the edges of the sprocket-wheel when in use, a ball being seated in said socket, substantially as set forth.

2. A drive-chain link, composed of two parallel link-plates provided with suitable end pivotal connections and separators, each plate having an opposite portion of a spherical socket formed in its surface and extending through the plate, the plates being extended beyond said sockets to embrace the overlapping edges of the sprocket-wheel when in use, a ball being seated in said socket, substantially as described.

3. The combination of a sprocket-wheel provided with parts of ball-sockets in its rim, with a drive-chain composed of links, each of which consists of two parallel plates embracing the edge or rim of the sprocket-wheel, each plate being provided with part of a ball-socket in its inner face, the plates being extended beyond said sockets to embrace the overlapping edges of the sprocket-wheel when in use, pivot-pins connecting the links together, separators to hold the link-plates at a proper distance apart to cause the part-sockets to register with parts of one ball-socket, and balls seated in the sockets of the links and engaging in the rim-sockets of the wheel, substantially as described.

HARRY A. SCHRY.

Witnesses:
ADOLPH F. GALL,
SIMON B. MYER.